(12) United States Patent
Kotani et al.

(10) Patent No.: US 9,225,018 B2
(45) Date of Patent: Dec. 29, 2015

(54) AIR CATHODE FOR AIR BATTERIES AND AIR BATTERY

(71) Applicants: Yukinari Kotani, Gotenba (JP); Shinji Nakanishi, Mishima (JP); Koji Nishio, Kyoto (JP); Tomohiko Okugaki, Kyoto (JP)

(72) Inventors: Yukinari Kotani, Gotenba (JP); Shinji Nakanishi, Mishima (JP); Koji Nishio, Kyoto (JP); Tomohiko Okugaki, Kyoto (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 220 days.

(21) Appl. No.: 14/041,729

(22) Filed: Sep. 30, 2013

(65) Prior Publication Data
US 2014/0106240 A1 Apr. 17, 2014

(30) Foreign Application Priority Data
Oct. 15, 2012 (JP) .................................. 2012-228315

(51) Int. Cl.
| | |
|---|---|
| *H01M 12/08* | (2006.01) |
| *H01M 4/58* | (2010.01) |
| *H01M 4/62* | (2006.01) |
| *H01M 4/50* | (2010.01) |
| *H01M 4/52* | (2010.01) |

(Continued)

(52) U.S. Cl.
CPC *H01M 4/50* (2013.01); *H01M 4/52* (2013.01); *H01M 4/624* (2013.01); *H01M 4/625* (2013.01); *H01M 4/8673* (2013.01); *H01M 4/9016* (2013.01); *H01M 12/08* (2013.01); *Y02E 60/50* (2013.01)

(58) Field of Classification Search
CPC ......... H01M 12/08; H01M 4/50; H01M 4/52; H01M 4/624; H01M 4/625; H01M 4/8673; H01M 4/9016

See application file for complete search history.

(56) References Cited

U.S. PATENT DOCUMENTS

| | | | | |
|---|---|---|---|---|
| 6,069,107 | A | * 5/2000 | Kuznetsov et al. | ........... 502/101 |
| 2006/0246344 | A1 | 11/2006 | Halalay et al. | |

(Continued)

FOREIGN PATENT DOCUMENTS

| | | |
|---|---|---|
| CN | 101171711 A | 4/2008 |
| CN | 101872868 A | 10/2010 |

(Continued)

OTHER PUBLICATIONS

Machine Translation of: JP 2011/198662A, Yoshida et al., Oct. 6, 2011.*

(Continued)

*Primary Examiner* — Kenneth Douyette
(74) *Attorney, Agent, or Firm* — Oliff PLC

(57) ABSTRACT

The present invention is to provide an air cathode for air batteries, having excellent high-rate discharge performance, and an air battery comprising the air cathode.

Disclosed is an air cathode for air batteries, using oxygen as an active material and configured to form an air battery comprising the air cathode, an anode and an electrolyte layer present between the air cathode and the anode, the air cathode comprising: a catalyst layer which contains at least an electrode catalyst and an electroconductive material; an oxide as the electrode catalyst, which is active against at least oxygen reduction reaction; and at least one kind of metal carbide as the electroconductive material, selected from the group consisting of a tungsten carbide, a titanium carbide and a molybdenum carbide.

7 Claims, 7 Drawing Sheets

(51) Int. Cl.
*H01M 4/86* (2006.01)
*H01M 4/90* (2006.01)

(56) References Cited

U.S. PATENT DOCUMENTS

2009/0011311 A1* 1/2009 Alexandrovichserov et al. ............................. 429/30
2012/0140378 A1* 6/2012 Tan et al. ....................... 361/500

FOREIGN PATENT DOCUMENTS

| | | |
|---|---|---|
| JP | A-8-504998 | 5/1996 |
| JP | A-2003-288905 | 10/2003 |
| JP | A-2009-283381 | 12/2009 |
| JP | A-2011-198662 | 10/2011 |
| WO | WO 94/10714 | 5/1994 |
| WO | 2012/056301 A1 | 5/2012 |
| WO | WO 2012/074622 A1 | 6/2012 |

OTHER PUBLICATIONS

May 27, 2015 Office Action issued in Chinese Patent Application No. 201310473072.3 (partial translation).

* cited by examiner

AIR CATHODE FOR AIR BATTERIES AND AIR BATTERY

TECHNICAL FIELD

The present invention relates to an air cathode for air batteries, having excellent high-rate discharge performance, and an air battery comprising the air cathode.

BACKGROUND ART

An air battery using oxygen as a cathode active material has advantages of high energy density, enabling reduction in size and weight, etc. Accordingly, it has received attention as a higher-energy density battery than lithium secondary batteries that are widely used now. Examples of air batteries include metal-air batteries such as lithium-air, magnesium-air, zinc-air and aluminum-air batteries.

A metal-air battery enables charge and discharge by oxidation-reduction reaction of oxygen at the air cathode (cathode) and oxidation-reduction reaction of an anode active material at the anode. A general metal-air battery comprises, for example, an air cathode containing an electroconductive material and a binder, an air cathode current collector for collecting current from the air cathode, an anode containing an anode active material (metal, alloy, etc.), an anode current collector for collecting current from the anode, and an electrolyte present between the air cathode and the anode.

For example, in a metal-air battery (secondary battery) in which the migrating ions are monovalent metal ions, it is thought that the following charge and discharge reactions proceed. In the following formulae, M means a metal species.

(Upon Discharge)

$M \rightarrow M^+ + e^-$  Anode $2M^+ + O_2 + 2e^- \rightarrow M_2O_2$ $4M^+ + O_2 + 4e^- \rightarrow 2M_2O$  Air cathode (Upon Charge)

$M^+ + e^- \rightarrow M$  Anode $M_2O_2 \rightarrow 2M^+ + O_2 + 2e^-$ $2M_2O \rightarrow 4M^+ + O_2 + 4e^-$  Air cathode The above charge and discharge reactions occur in the case where the electrolyte is a non-aqueous liquid electrolyte or solid electrolyte, and the metal oxide produced at the air cathode upon discharge is deposited at the air cathode. On the other hand, in the case where the electrolyte is an aqueous liquid electrolyte, it is thought that the following charge and discharge reactions proceed. Upon discharge, in the liquid electrolyte, the dissolved metal ion ($M^+$) reacts with the hydroxide ion ($OH^-$) to produce a water-soluble metal hydroxide.

(Upon Discharge)

$M \rightarrow M^+ + e^-$  Anode $O_2 + 2H_2O + 4e^- \rightarrow 4OH^-$  Air cathode (Upon Charge)

$M^+ + e^- \rightarrow M$  Anode $4OH^- \rightarrow O_2 + 2H_2O + 4e^-$  Air cathode To promote the electrode reaction at the air cathode upon discharge and/or charge (oxidation-reduction reaction of oxygen) and thus to increase the battery characteristics of an air battery, a catalyst is added to the air cathode (for example, Patent Literature 1).

In particular, a lithium-air secondary battery is disclosed in Patent Literature 1, comprising: a cathode comprising a gas diffusion type oxygen electrode mainly composed of carbon; an anode comprising a lithium metal or a material being able to absorb and release lithium ions; and a non-aqueous electrolyte medium present between the cathode and the anode, wherein Fe-based oxide $La_{1-x}A_xFe_{1-y}B_yO_3$ (A: alkaline earth metal, $0 \leq x < 1.0$, B: transition metal, $0 \leq y < 1.0$) having a perovskite structure, is contained as an electrode catalyst in the cathode.

CITATION LIST

Patent Literature 1: Japanese Patent Application Laid-Open No. 2009-283381

SUMMARY OF INVENTION

Technical Problem

However, the air cathode of the air battery as disclosed in Patent Literature 1 shows low oxygen reduction potential upon discharge at high current density; therefore, it is problematic in that an air battery with excellent high-rate discharge performance cannot be obtained.

The present invention was achieved in light of the above circumstance, and the object of the present invention is to provide an air cathode for air batteries, having excellent high-rate discharge performance, and an air battery comprising the air cathode.

Solution to Problem

The air cathode for air batteries according to the present invention, is an air cathode for air batteries, using oxygen as an active material and configured to form an air battery comprising the air cathode, an anode and an electrolyte layer present between the air cathode and the anode, the air cathode comprising:
a catalyst layer which contains at least an electrode catalyst and an electroconductive material;
an oxide as the electrode catalyst, which is active against at least oxygen reduction reaction; and
at least one kind of metal carbide as the electroconductive material, selected from the group consisting of a tungsten carbide, a titanium carbide and a molybdenum carbide.

The air cathode for air batteries according to the present invention, shows a small decrease in oxygen reduction potential, even upon discharge at high current density; therefore, the air cathode makes it possible to provide an air battery with excellent high-rate discharge performance.

In the air cathode for air batteries according to the present invention, when the metal carbide is a tungsten carbide, the ratio of the tungsten carbide to the amount of the catalyst layer is preferably 28 to 71% by weight, and the ratio of the tungsten carbide to the total amount of the oxide and the tungsten carbide is preferably 28 to 71% by weight.

When the metal carbide is a titanium carbide, the ratio of the titanium carbide to the amount of the catalyst layer is preferably 5 to 71% by weight, and the ratio of the titanium carbide to the total amount of the oxide and the titanium carbide is preferably 5 to 71% by weight.

When the metal carbide is a molybdenum carbide, the ratio of the molybdenum carbide to the amount of the catalyst layer is preferably 5 to 71% by weight, and the ratio of the molybdenum carbide to the total amount of the oxide and the molybdenum carbide is preferably 5 to 71% by weight.

An example of the oxide is a complex oxide comprising at least one kind of metal element selected from the group consisting of iron, cobalt, nickel, titanium, manganese and copper and having a perovskite structure or spinel structure.

An example of the oxide is a complex oxide having a perovskite structure and having a composition represented by $La_{1-x}A_xBO_3$ (wherein A is at least one kind selected from the group consisting of Sr and Ca; B is at least one kind selected from the group consisting of Co, Fe and Mn; and x is a number which satisfies $0 \leq x \leq 1$).

In the air cathode for air batteries according to the present invention, the electroconductive material may further comprise an electroconductive carbon.

The air cathode for air batteries according to the present invention may further comprise a gas diffusion layer comprising at least electroconductive carbon particles and a binder, and the catalyst layer and the gas diffusion layer may be stacked in this order from the electrolyte layer side.

The air battery according to the present invention is an air battery comprising: an air cathode using oxygen as an active material, an anode and an electrolyte layer present between the air cathode and the anode, wherein the air cathode is the air cathode for air batteries according to the present invention.

Advantageous Effects of Invention

The air cathode for air batteries according to the present invention shows a small decrease in oxygen reduction potential, even upon discharge at high current density; therefore, according to the present invention, it is possible to provide an air battery with excellent high-rate discharge performance.

DESCRIPTION OF EMBODIMENTS

The air cathode for air batteries according to the present invention, is an air cathode for air batteries, using oxygen as an active material and configured to form an air battery comprising the air cathode, an anode and an electrolyte layer present between the air cathode and the anode, the air cathode comprising:
a catalyst layer which contains at least an electrode catalyst and an electroconductive material;
an oxide as the electrode catalyst, which is active against at least oxygen reduction reaction; and
at least one kind of metal carbide as the electroconductive material, selected from the group consisting of a tungsten carbide, a titanium carbide and a molybdenum carbide The air cathode for air batteries according to the present invention and the air battery of the present invention, will be explained hereinafter, with reference to figures.

Figure 1:
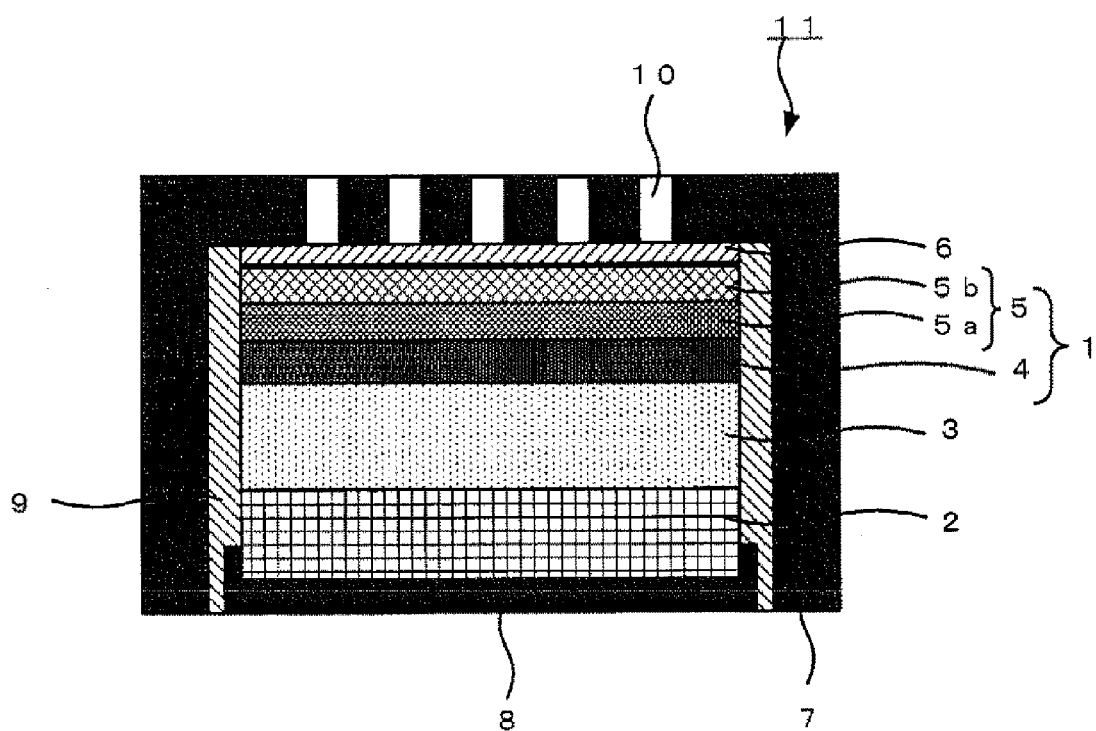
FIG. 1 is a schematic sectional view showing an embodiment example of the air battery comprising the air cathode of the present invention.

FIG. 1 is a schematic sectional view showing an embodiment example of the air battery comprising the air cathode for air batteries according to the present invention.

FIG. 1 shows that in an air battery 11, an air cathode (cathode) 1 and an anode 2 are stored in a battery case comprising an air cathode can 7 and an anode can 8. The air cathode 1 and the anode 2 are stacked so that an electrolyte layer 3 is present between the air cathode 1 and the anode 2. The air cathode can 7 and the anode can 8 are fixed by a gasket 9 to ensure the insulation properties of the air cathode and anode cans.

The air cathode 1 has such a structure that a catalyst layer 4 and a gas diffusion layer 5 are stacked in this order from the electrolyte layer 3 side. The air cathode 1 is gas permeable and can diffuse an active material, oxygen (air).

The catalyst layer 4 is a site for oxidation-reduction reaction of oxygen, and it comprises the following: an oxide which functions as an electrode catalyst (an oxide which is active against at least oxygen reduction reaction, such as $La_{0.7}Sr_{0.3}CoO_3$); a metal carbide (at least one kind selected from the group consisting of a tungsten carbide, a titanium carbide and a molybdenum carbide) as the electroconductive material; and a binder (e.g., polytetrafluoroethylene).

The gas diffusion layer 5 functions to deliver an active material, oxygen (air), to the catalyst layer 4, efficiently; moreover, it is electroconductive. The gas diffusion layer 5 has a two-layered structure in which a first gas diffusion layer 5a and a second gas diffusion layer 5b are stacked in this order from the catalyst layer 4 side, the first gas diffusion layer 5a comprising at least electroconductive carbon particles and a binder, and the second gas diffusion layer 5b being composed of a gas-permeable porous material such as carbon paper.

The air cathode 1 is provided with an air cathode current collector 6 for collecting current from the air cathode 1. The air cathode current collector 6 is composed of a gas-permeable electroconductive material (e.g., metal mesh). Oxygen (air) taken in from an oxygen inlet hole 10 provided in the air cathode can 7 is supplied to the air cathode 1 through the air cathode current collector 6. In the air cathode 1, oxygen is supplied to the catalyst layer 4 through the gas diffusion layer 5.

The anode 2 comprises, for example, an anode active material (e.g., lithium metal, zinc metal) which can release and absorb metal ions. The anode can 8 is in contact with the anode 2 and functions as a current collector of the anode 2.

The electrolyte layer 3 contains an aqueous liquid electrolyte (e.g., alkaline aqueous solution). A separator (not shown)

composed of an insulating porous material and placed between the air cathode 1 and the anode 2, is impregnated with the liquid electrolyte.

As a result of diligent researches, the inventors of the present invention have found that the oxygen reduction potential of an air cathode is increased by using at least one kind of metal carbide selected from the group consisting of a tungsten carbide, a titanium carbide and a molybdenum carbide, as the electroconductive material for forming the catalyst layer of an air cathode. The mechanism is not clear at this point; however, it is presumed as follows.

A metal carbide is larger in specific gravity than electroconductive carbon particles. Accordingly, a catalyst layer comprising electroconductive particles and an oxide which is active against at least oxygen reduction reaction (hereinafter it may be referred to as oxide electrode catalyst) is provided with higher density by further containing a metal carbide, so that the content of the oxide electrode catalyst in the catalyst layer is higher even though the thickness of the catalyst layer remains the same. Accordingly, the catalyst layer shows high-level catalytic functions. As a result, it is thought that there is an increase in discharge performance.

In the case where no electroconductive carbon particles are contained in the catalyst layer or the content is small, the catalyst layer shows high-level catalytic functions by adding a metal carbide, since sufficient electroconductivity cannot be obtained by the oxide electrode catalyst only. It is thought that as a result, there is an increase in discharge performance.

Also, by using the above-described metal carbide as the electroconductive material, there is such an effect that the durability of the air cathode is increased higher than the case of using, as the electroconductive material, an electroconductive carbon solely. This is because the metal carbide is more superior to electroconductive carbons in oxidation resistance.

In the case where the air cathode catalyst layer contains an electroconductive carbon, decomposition of the electroconductive carbon at high oxygen reduction potential, is suppressed by adding a metal carbide to the air cathode catalyst layer. As a result, it is possible to maintain the electron conductivity on the surface of the air cathode catalyst layer.

In the present invention, "air battery" is not particularly limited as long as it uses oxygen as a cathode active material. In the present invention, "air battery" may be either a secondary battery or a primary battery, for example. Because the air cathode for air batteries according to the present invention has excellent high-rate discharge performance, it is effective in increasing discharge voltage in either a primary battery, which performs discharge only, or a secondary battery, which performs charge and discharge.

Concrete examples of air batteries include metal-air batteries such as a lithium-air battery, a sodium-air battery, a potassium-air battery, a magnesium-air battery, a calcium-air battery, a zinc-air battery, an aluminum-air battery and an iron-air battery.

Hereinafter, the components of the air cathode for air batteries according to the present invention and those of the air battery of the present invention, will be explained in detail.

[Air Cathode for Air Batteries]

The air cathode comprises: a catalyst layer which contains at least an electrode catalyst and an electroconductive material; an oxide as the electrode catalyst, which is active against at least oxygen reduction reaction (oxide electrode catalyst); and at least one kind of metal carbide as the electroconductive material, selected from the group consisting of a tungsten carbide, a titanium carbide and a molybdenum carbide. The air cathode is porous and ensures diffusibility of oxygen (air), which is an active material.

The oxide electrode catalyst is not particularly limited as long as it is active against at least oxygen reduction reaction. For example, there may be mentioned oxides belonging to the cubic system.

From the viewpoint of electrocatalytic activity, a preferred oxide electrode catalyst is a complex oxide comprising at least one kind of metal element selected from the group consisting of iron, cobalt, nickel, titanium, manganese and copper and having a perovskite structure or spinel structure.

"Complex oxide" is an oxide comprising two or more kinds of metal elements. Examples of the above complex oxide include: one comprising at least one kind of metal element selected from the group consisting of iron, cobalt, nickel, titanium, manganese and copper and other metal element(s); and one comprising at least two or more kinds of metal elements selected from the group consisting of iron, cobalt, nickel, titanium, manganese and copper.

Of those, from the viewpoint of electrocatalytic activity, preferred is one having a perovskite structure and having a composition represented by $La_{1-x}A_xBO_3$ (wherein A is at least one kind selected from the group consisting of Sr and Ca; B is at least one kind selected from the group consisting of Co, Fe and Mn; and x is a number which satisfies $0 \leq x \leq 1$).

There may be used one kind of oxide electrode catalyst solely or a combination of two or more kinds of oxide electrode catalysts.

From the viewpoint of exhibition of catalytic performance and processability as an electrode, the oxide electrode catalyst is preferably in the form of particles. It is more preferable that the average particle diameter is 100 μm or less, particularly 5 μm or less. The average particle diameter of the electrode catalyst can be measured by laser diffractometry, for example.

There may be used one kind of metal carbide solely or a combination of two or more kinds of metal carbides.

From the viewpoint of electroconductivity imparting effect and processability, the metal carbide is preferably in the form of particles. It is more preferable that the average particle diameter is 100 μm or less, particularly 10 μm or less. The average particle diameter of the metal carbide can be measured by laser diffractometry, for example.

In the air cathode catalyst layer, the content of the metal carbide is not particularly limited. However, it is preferable to determine the metal carbide content, considering, for example, the following: as the density of the air cathode catalyst layer increases too much, the gas permeability of the air cathode catalyst layer decreases, and thus oxygen reduction reaction is not smoothly promoted; moreover, the balance between catalytic performance and electroconductivity is important in providing excellent discharge performance.

In the case of using a tungsten carbide as the metal carbide, from the viewpoint of high-rate discharge performance, the ratio of the tungsten carbide in the catalyst layer to the amount of the catalyst layer, is preferably 20% by weight or more, particularly preferably 28% by weight or more, and preferably 90% by weight or less, particularly preferably 71% by weight or less.

In the case of using a titanium carbide as the metal carbide, from the viewpoint of high-rate discharge performance, the ratio of the titanium carbide in the catalyst layer to the amount of the catalyst layer, is preferably 2% by weight or more, particularly preferably 5% by weight or more, and preferably 90% by weight or less, particularly preferably 71% by weight or less.

In the case of using a molybdenum carbide as the metal carbide, from the viewpoint of high-rate discharge performance, the ratio of the molybdenum carbide in the catalyst layer to the amount of the catalyst layer, is preferably 2% by weight or more, particularly preferably 5% by weight or more, and preferably 90% by weight or less, particularly preferably 71% by weight or less.

The ratio between the metal carbide and oxide electrode catalyst, both of which are essential components of the catalyst layer, is not particularly limited. However, from the viewpoint of the balance between electroconductivity and the amount of the oxide electrode catalyst supported per unit area, it is preferable to determine the ratio. Specifically, the ratio of the metal carbide to the total amount of the oxide electrode catalyst and the metal carbide (the weight of the metal carbide/the total weight of the oxide electrode catalyst and the metal carbide×100%) is preferably 2% by weight or more, particularly preferably 5% by weight or more, and preferably 90% by weight or less, particularly preferably 71% by weight or less.

More specifically, in the case of using a tungsten carbide as the metal carbide, the ratio of the tungsten carbide to the total amount of the oxide electrode catalyst and the tungsten carbide, is preferably 20% by weight or more, particularly preferably 28% by weight or more, and preferably 90% by weight or less, particularly preferably 71% by weight or less.

In the case of using a titanium carbide as the metal carbide, the ratio of the titanium carbide to the total amount of the oxide electrode catalyst and the titanium carbide, is preferably 2% by weight or more, particularly preferably 5% by weight or more, and preferably 90% by weight or less, particularly preferably 71% by weight or less.

In the case of using a molybdenum carbide as the metal carbide, the ratio of the molybdenum carbide to the total amount of the oxide electrode catalyst and the molybdenum carbide, is preferably 2% by weight or more, particularly preferably 5% by weight or more, and preferably 90% by weight or less, particularly preferably 71% by weight or less.

In the air cathode of the present invention, in addition to the metal carbide, the catalyst layer may further contain other electroconductive material(s). Concrete examples of electroconductive materials include electroconductive carbons.

An electroconductive carbon contributes to the ensuring of electron conductivity in the catalyst layer; moreover, it is active against oxygen reduction reaction and has a function of promoting discharge reaction in the air battery. Examples of electroconductive carbons include carbon blacks such as acetylene black and furnace black, electroconductive carbon particles such as graphite and activated carbon, and electroconductive carbon fibers such as carbon nanotubes and carbon nanofibers.

From the viewpoint of imparting electroconductivity and oxidation resistance, the electroconductive carbon has a specific surface area of preferably 5 $m^2/g$ or more, particularly preferably 10 $m^2/g$ or more, and preferably 1,000 $m^2/g$ or less, particularly preferably 500 $m^2/g$ or less.

The specific surface area of the electroconductive carbon can be measured by a nitrogen adsorption method, for example.

In the case of using electroconductive carbon particles as the electroconductive carbon, the average particle diameter is preferably 20 μm or less, particularly preferably 10 μm or less. The average particle diameter of the electroconductive carbon particles can be measured by laser diffractometry, for example.

From the viewpoint of fixing of the oxide electrode catalyst and metal carbide electroconductive material and formability of the catalyst layer, it is preferable that the catalyst layer generally comprises a binder.

Concrete examples of the binder include polyvinylidene fluoride (PVDF), polytetrafluoroethylene (PTFE) and styrene-butadiene rubber (SBR).

The binder does not directly contribute to electrode activity. Accordingly, the content of the binder in the catalyst layer is preferably as small as possible to the extent that the strength of the catalyst layer can be maintained. For example, the binder content is preferably 30% by weight or less.

In addition to the above components, the catalyst layer may further contain other component(s).

The air cathode for air batteries according to the present invention may be one comprising only the catalyst layer. However, to uniformly supply oxygen (air) to the catalyst layer, it may also comprise a gas diffusion layer.

The gas diffusion layer may be composed of, for example, an electroconductive porous material such as a carbon paper, carbon sheet, porous metal or porous metal compound. The thickness of the gas diffusion layer composed of such an electroconductive porous material (the second gas diffusion layer) is not particularly limited.

Also, as the gas diffusion layer (the first gas diffusion layer), it is also possible to provide a layer comprising at least electroconductive carbon particles and a binder, the particles being described above as the electroconductive carbon which constitutes the catalyst layer.

The concrete materials for the electroconductive carbon particles and the average particle diameter and specific surface area of the particles are not described here since they are the same as those of the above-described electroconductive carbon particles which constitute the catalyst layer. Examples of the binder include polyvinylidene fluoride (PVDF), polytetrafluoroethylene (PTFE) and styrene-butadiene rubber (SBR).

In the first gas diffusion layer, the ratio between the electroconductive carbon particles and the binder is not particularly limited.

In the case of using the above-described first gas diffusion layer as the gas diffusion layer, it is preferable that the catalyst layer 4 and the gas diffusion layer (the first gas diffusion layer) 5a are arranged to be stacked in this order, from the closest to the electrolyte layer 3, as shown in FIG. 1. The electroconductive carbon particles are active against oxygen reduction reaction; therefore, an oxygen reduction reaction-promoting effect by the electroconductive carbon particles, can be obtained by arranging the gas diffusion layer comprising the electroconductive carbon particles adjacent to the catalyst layer.

Also, due to the above-described low oxidation resistance of the electroconductive carbonaceous material, in the case of using the air cathode of the present invention as the air cathode of a secondary battery, decomposition of the electroconductive carbon particles can be suppressed upon charge, while ensuring discharge characteristics, by using no electroconductive carbonaceous material in the catalyst layer and arranging the first gas diffusion layer comprising the electroconductive carbon particles adjacent to the catalyst layer.

The thickness of the first gas diffusion layer comprising the electroconductive carbon particles is not particularly limited. However, the thickness can be about 0.1 to 100 μm, for example.

The gas diffusion layer may be only the first or second gas diffusion layer, or it may be a two-layered structure in which the first and second gas diffusion layers are stacked. The gas diffusion layer may further contain a layer other than the first and second gas diffusion layers. In the case of stacking the first and second gas diffusion layers, the structure is preferably such that the catalyst layer, the gas diffusion layer 1 and the gas diffusion layer 2 are stacked in this order from the electrolyte layer side.

In addition to the catalyst layer and the gas diffusion layer, the air cathode may further comprise an air cathode current collector for collecting current from the air cathode.

The air cathode current collector may be gas-permeable or dense, as long as it has desired electron conductivity and does not hinder diffusion of oxygen to the air cathode. From the viewpoint of air (oxygen) diffusivity, the air cathode current collector is preferably gas-permeable. A dense current collector can be used as the air cathode current collector, only in the case where it does not cover the whole surface of the air cathode.

Examples of gas-permeable structures include a mesh structure in which constituent fibers are regularly arranged, a non-woven fabric structure in which constituent fibers are randomly arranged, and a three-dimensional network with separate/connected holes.

Examples of the material for the air cathode current collector include metal materials such as stainless steel, nickel, aluminum, iron, titanium and copper, carbonaceous materials such as carbon fiber and carbon paper, and highly electron-conductive ceramic materials such as titanium nitride.

The thickness of the air cathode current collector is not particularly limited. In general, however, the thickness is preferably as thin as possible, as long as sufficiently low resistance to used current and sufficient mechanical strength can be ensured. For example, the thickness is preferably 1,000 µm or less, particularly preferably 400 µm or less.

The below-described battery case of the air battery can also function as the air cathode current collector.

The method for producing the air cathode is not particularly limited. For example, the catalyst layer can be produce by roll-pressing or applying the air cathode material comprising the above-described oxide electrode catalyst, metal carbide, binder and a solvent (dispersion medium) to be formed, and then performing a drying treatment, pressure treatment, heat treatment or the like on the formed material, as needed. Or, the catalyst layer and the gas diffusion layer can be stacked in such a manner that first, the catalyst layer is produced by roll-pressing or applying the air cathode material to be formed and then performing a drying treatment, pressure treatment, heat treatment or the like on the formed material, as needed; thereafter, the thus-obtained catalyst layer and the gas diffusion layer are superimposed on each other and subjected to pressing, heating or the like to stack. Also, the catalyst layer can be produced on the surface of the gas diffusion layer in such a manner that the air cathode material comprising the above-described electrode catalyst, metal carbide, binder and a solvent (dispersion medium) is formed on the surface of the gas diffusion layer by roll-pressing or applying the material thereon; thereafter, a drying treatment, pressure treatment, heat treatment or the like is performed on the thus-obtained catalyst layer, as needed.

The first gas diffusion layer comprising the electroconductive carbon particles and the binder can be produced by, for example, roll-pressing or applying the gas diffusion layer material comprising the above-described electroconductive carbon particles and binder and a solvent (dispersion medium) to be formed, and performing a drying treatment, pressure treatment, heat treatment or the like on the formed material, as needed.

The solvent and dispersion medium used in the air cathode material and the gas diffusion layer material is not particularly limited and can be appropriately selected. Concrete examples thereof include water, ethanol, isopropyl alcohol, acetone and N-methyl-2-pyrrolidone.

[Air Battery]

Next, the air battery of the present invention will be described.

The air battery of the present invention is an air battery comprising: an air cathode using oxygen as an active material, an anode and an electrolyte layer present between the air cathode and the anode, wherein the air cathode is the air cathode for air batteries according to the present invention.

Hereinafter, the components of the air battery of the present invention will be described. The air cathode of the air battery will not be described here since it is the same as the air cathode described above under "Air cathode for air batteries".

(Anode)

The anode comprises at least an anode active material.

The anode active material is not particularly limited as long as it allows oxidation-reduction reaction of metal ions. The examples include elemental metals, alloys, metal oxides, metal sulfides and metal nitrides, all of which comprise metal ions. Also, carbonaceous materials can be used as the anode active material. Preferred as the anode active material are elemental metals and alloys, and particularly preferred are elemental metals. Examples of elemental metals include lithium, sodium, potassium, magnesium, calcium, aluminum and zinc. Examples of alloys include alloys each comprising at least one kind selected from the group consisting of these elemental metals.

Concrete examples of anode active materials for lithium-air batteries include lithium metal; lithium alloys such as lithium-aluminum alloy, lithium-tin alloy, lithium-lead alloy and lithium-silicon alloy; metal oxides such as tin oxide, silicon oxide, lithium-titanium oxide, niobium oxide and tungsten oxide; metal sulfides such as tin sulfide and titanium sulfide; metal nitrides such as lithium-cobalt nitride, lithium-iron nitride and lithium-manganese nitride; and carbonaceous materials such as graphite. Of them, preferred are lithium metal.

The anode is just needed to comprise at least the anode active material. However, as needed, it can also comprise a binder for fixing the anode active material. For example, in the case of using a metal or alloy foil as the anode active material, the anode can be in the form of containing the anode active material only. In the case of using a powdery anode active material, the anode can be in the form of containing the anode active material and the binder. Also, the anode may comprise an electroconductive material, as needed. The type and amount of the binder and electroconductive material used are the same as those of the above-described air cathode, so that they are not explained here.

The anode may also comprise an anode current collector for collecting current from the anode. The material for the anode current collector is not particularly limited as long as it is electrically-conductive. The examples include copper, stainless steel and nickel. As the form of the anode current collector, there may be mentioned a foil form, a plate form and a mesh form. The battery case can also function as the anode current collector.

The method for producing the anode is not particularly limited. For example, there may be a method in which the anode active material in the form of foil and the anode current collector are stacked and pressed. Or, there may be mentioned a different method in which an anode material comprising the anode active material and the binder is roll-pressed or applied to produce the anode, and the anode and the anode current collector are stacked, as needed.

(Electrolyte Layer)

The electrolyte layer is not particularly limited as long as it can conduct desired ions between the air cathode and the anode. The electrolyte layer may be a liquid or solid electrolyte. Also, there may be used a combination of liquid and solid electrolytes.

As the liquid electrolyte, there may be used a non-aqueous or aqueous liquid electrolyte.

The non-aqueous liquid electrolyte comprises an electrolyte salt and a non-aqueous solvent.

The non-aqueous solvent is not particularly limited. The examples include propylene carbonate, ethylene carbonate, vinylene carbonate, dimethyl carbonate, ethyl methyl carbonate, diethyl carbonate, methyl propyl carbonate, isopropyl methyl carbonate, ethyl propionate, methyl propionate, γ-butyrolactone, ethyl acetate, methyl acetate, tetrahydrofuran, 2-methyltetrahydrofuran, ethylene glycol dimethyl ether, ethylene glycol diethyl ether, acetonitrile, dimethyl sulfoxide, diethoxyethane, 1,1-dimethoxyethane, and tetraethylene glycol dimethyl ether.

Also, an ionic liquid may be used as the non-aqueous solvent. Examples of ionic liquids include aliphatic quaternary ammonium salts such as N,N,N-trimethyl-N-propylammonium bis(trifluoromethanesulfonyl)amide, N-methyl-N-propylpiperidinium bis(trifluoromethanesulfonyl)amide, N-methyl-N-propylpyrrolidinium bis(trifluoromethanesulfonyl)amide, N-methyl-N-butylpyrrolidinium bis(trifluoromethanesulfonyl)amide, and N,N-diethyl-N-methyl-N-(2-methoxyethyl)ammonium bis(trifluoromethanesulfonyl)amide; and alkylimidazolium quaternary salts such as 1-methyl-3-ethylimidazolium tetrafluoroborate, 1-methyl-3-ethylimidazolium bis(trifluoromethanesulfonyl)amide, 1-allyl-3-ethylimidazolium bromide, 1-allyl-3-ethylimidazolium tetrafluoroborate, 1-allyl-3-ethylimidazolium bis(trifluoromethanesulfonyl)amide, 1,3-diallylimidazolium bromide, 1,3-diallylimidazolium tetrafluoroborate, and 1,3-diallylimidazolium bis(trifluoromethanesulfonyl)amide.

The electrolyte salt is needed to be soluble in non-aqueous solvents and to be able to exhibit desired ion conductivity. For example, a metal salt containing a metal ion desired to be conducted, can be used as the electrolyte salt. For example, in the case of lithium-air battery, lithium salts can be used as the electrolyte salt. For example, there may be used inorganic lithium salts such as $LiPF_6$, $LiBF_4$, $LiClO_4$, $LiAsF_6$, $LiOH$, $LiCl$, $LiNO_3$ and $Li_2SO_4$; and organic lithium salts such as $CH_3CO_2Li$, lithium bis(oxalate)borate (abbreviation: LiBOB), $LiN(CF_3SO_2)_2$ (abbreviation: LiTFSA), $LiN(C_2F_5SO_2)_2$ (abbreviation: LiBETA) and $LiN(CF_3SO_2)(C_4F_9SO_2)$.

In the non-aqueous liquid electrolyte, the content of the electrolyte salt relative to the non-aqueous solvent, is not particularly limited. The content may be appropriately determined depending on the combination of the solvent and the electrolyte salt.

The non-aqueous liquid electrolyte may be used in the form of gel by adding a polymer thereto. Examples of methods for gelation of the non-aqueous liquid electrolyte, include a method of adding a polymer such as polyethylene oxide (PEO), polyacrylonitrile (PAN), polyvinylidene fluoride (PVDF) or polymethyl methacrylate (PMMA) to the non-aqueous liquid electrolyte.

Examples of the aqueous liquid electrolyte include alkaline aqueous solutions and acidic aqueous solutions. The aqueous liquid electrolyte may be appropriately selected, depending on the type of the anode active material. Examples of alkaline aqueous solutions include a potassium hydroxide aqueous solution and a sodium hydroxide aqueous solution. Examples of acidic aqueous solutions include hydrochloric acid, a nitric acid solution and a sulfuric acid solution.

In the case of using the aqueous liquid electrolyte, the constituent materials of the anode may react with water, depending on the type of the materials. Accordingly, to protect the anode, it is preferable to arrange a solid electrolyte between the aqueous liquid electrolyte and the anode. As the solid electrolyte, there may be used the following.

Examples of the solid electrolyte include inorganic solid electrolytes such as a solid sulfide electrolyte and a solid oxide electrolyte. In the case of using an inorganic solid electrolyte, it may be in the form of glass, crystal or glass ceramic.

A concrete inorganic solid electrolyte can be appropriately selected, depending on ions to be conducted.

In the case of using a solid sulfide electrolyte, it is not particularly limited as long as it contains sulfur (S) and is ion-conductive. Concrete examples of lithium ion-conductive, solid sulfide electrolyte materials include $Li_2S-P_2S_5$ ($Li_2S:P_2S_5=50:50$ to 100:0), $Li_2S-P_2S_5-LiI$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (Z=Ge, Zn, Ga), $Li_2S-GeS_2$, $Li_2S-SiS_2-Li_3PO_4$, and $Li_2S-SiS_2-Li_xMO_y$ (M=P, Si, Ge, B, Al, Ga, In).

Concrete examples of lithium ion-conductive, solid oxide electrolytes include LiPON (lithium phosphorus oxynitride), $Li_{1.3}Al_{0.3}Ti_{0.7}(PO_4)_3$, $La_{0.51}Li_{0.34}TiO_{0.74}$, $Li_3PO_4$, $Li_2SiO_2$, and $Li_2SiO_4$.

(Others)

The air battery generally comprises a battery case for housing the air cathode, the anode and the electrolyte layer. The form of the battery case is not particularly limited; however, concrete examples thereof include a coin form, a flat plate form, a cylinder form and a laminate form. The battery case can be an open-to-the-atmosphere battery case or a closed battery case.

The open battery case has such a structure that at least the air cathode can be sufficiently exposed to the atmosphere.

On the other hand, the closed battery case can be provided with oxygen (air) inlet and outlet tubes, which is a cathode active material.

Each of the air cathode current collector and the anode current collector can be provided with a terminal, which functions as a connection to the outside.

The method for producing the air battery of the present invention is not particularly limited and can be selected from general methods.

EXAMPLES

Hereinafter, the present invention will be described in detail, by way of examples and comparative examples. However, the present invention is not limited to these examples.

Example 1

Production of Oxide Electrode Catalyst

An oxide with a perovskite-type crystal structure ($La_{0.7}Sr_{0.3}CoO_3$) was produced in the following manner.

A lanthanum nitrate hexahydrate ($La(NO_3)_3 \cdot 6H_2O$), a strontium nitrate ($Sr(NO_3)_2$) and a cobalt nitrate hexahydrate ($Co(NO_3)_2 \cdot 6H_2O$) were used, which are an La source, an Sr source and a Co source, respectively. They were mixed so as to have a ratio of La:Sr:Co=0.7:0.3:1 (mol ratio). This mixture was added to water so that the total molar concentration of the La, Sr and Co elements is 0.05 mol/L, thereby preparing a raw material nitric acid aqueous solution.

On the other hand, an aqueous solution containing 0.5 mol/L potassium hydroxide and 0.03 mol/L tetrapropylammonium bromide was prepared.

Next, to this aqueous solution, the raw material nitric acid aqueous solution was added dropwise. The thus-obtained precipitate (a hydroxide) was filtered, dried and then fired at 700° C. for 5 hours, thus obtaining $La_{0.7}Sr_{0.3}CoO_3$. The thus-obtained $La_{0.7}Sr_{0.3}CoO_3$ was pulverized to a powder (average particle diameter: about 1 μm). The average particle diameter of the oxide electrode catalyst was measured by laser diffractometry.

(Production of Air Cathode for Secondary Batteries)

First, as shown in Table 1, the oxide electrode catalyst ($La_{0.7}Sr_{0.3}CoO_3$) produced above, a tungsten carbide (manufactured by: Kojundo Chemical Laboratory Co., Ltd.; average particle diameter: about 8 μm), an acetylene black (manufactured by: Denki Kagaku Kogyo Kabushiki Kaisha; average particle diameter: about 1 μm; specific surface area: 33 $m^2/g$; true density: about 1.8 $g/cm^3$) and a polytetrafluoroethylene dispersion liquid (manufactured by: Sigma-Aldrich Japan K.K.; 60% by weight) were mixed so as to have a ratio of oxide electrode catalyst:tungsten carbide:acetylene black:PTFE=40:30:10:20 (weight ratio) and then kneaded. The resultant was roll-pressed by means of an electric roll-pressing roller to have a thickness of about 200 μm, thus preparing a catalyst layer in the form of a sheet. This catalyst layer was cut into a disk having a diameter of about 24 mm to obtain a disk-shaped catalyst layer.

Next, the disk-shaped catalyst layer was attached by pressure to a first surface of a carbon paper (EC-TP1-120T manufactured by ElectroChem. Inc.) in the form of a disk having a diameter of about 24 mm, thus obtaining an air cathode. The carbon paper functions as the gas diffusion layer and substrate of the air cathode.

(Evaluation of Air Cathode for Secondary Batteries)

The electrode reaction characteristics of the air cathode produced above were evaluated as follows, by means of a two-compartment cell.

Figure 2:
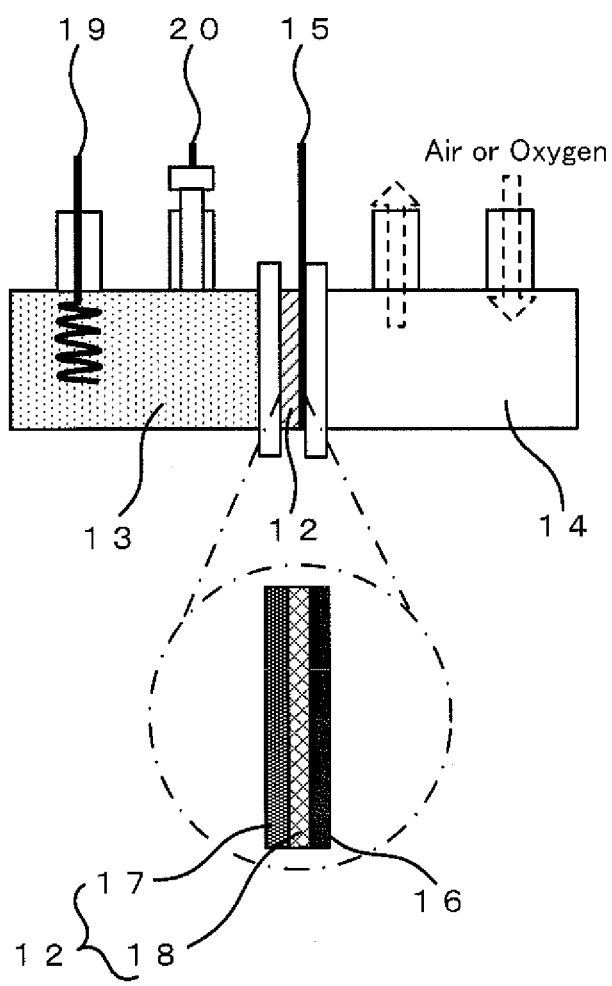
FIG. 2 is a schematic sectional view of the two-compartment cell used for air cathode evaluation in Examples 1 to 4 and Comparative Examples 1 and 2.

FIG. 2 shows a schematic sectional view of the two-compartment cell used for the evaluation. The air cathode 12 used in the test was sandwiched between an anode room 13 and a cathode room 14 and used as a working electrode 15 having an effective electrode area (a circle having a diameter of 20 mm) of 3.14 $cm^2$. As a current collector 16, a nickel mesh (100 mesh) was attached by pressure to the carbon paper side of the air cathode 12 to obtain a structure in which the catalyst layer 17, the carbon paper 18 and the current collector 16 are stacked in this order.

The anode room 13 was filled with 8 mol/L potassium hydroxide aqueous solution, and air or oxygen was supplied to the cathode room 14 at 50 $cm^3$/min.

A platinum wire was used as a counter electrode 19. A mercury oxide electrode was used as a reference electrode 20.

The air cathode 12 was evaluated by measuring the potential of the working electrode 15, while applying a constant current to the working electrode 15 for a fixed time. The measurement temperature was fixed at 50° C. The results are shown in FIGS. 3 and 4.

Figure 3:
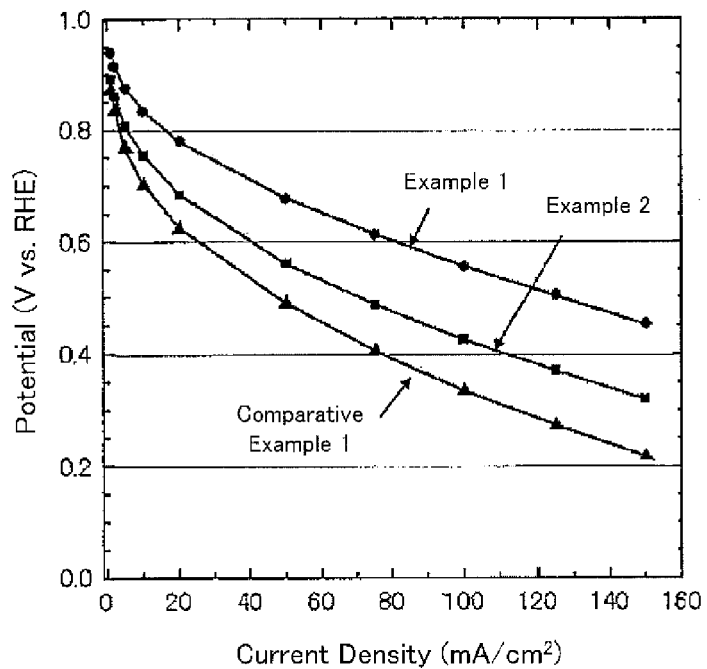
FIG. 3 is a graph showing the current and potential characterization results for the oxygen reduction reaction of the air cathodes of Examples 1 and 2 and Comparative Example 1.
Figure 4:
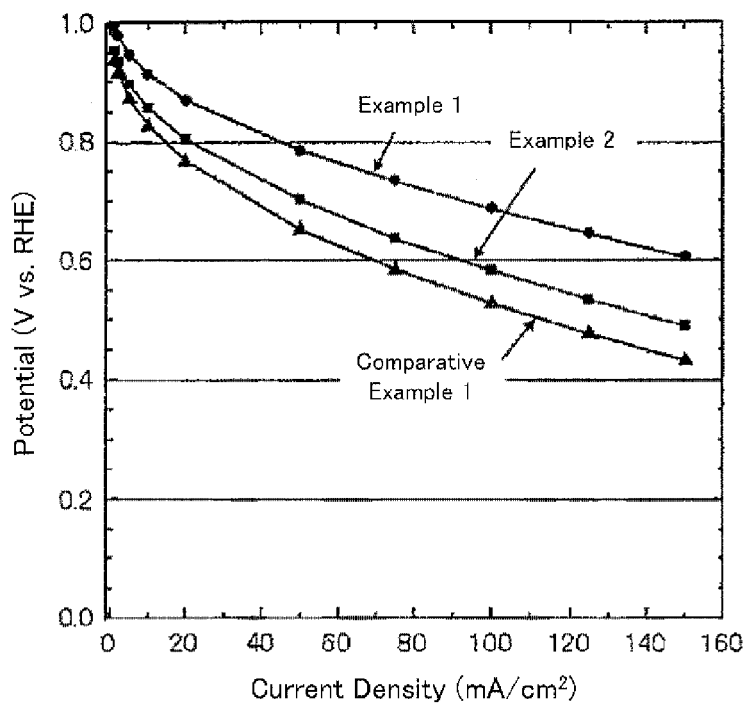
FIG. 4 is a graph showing the current and potential characterization results for the oxygen reduction reaction of the air cathodes of Examples 1 and 2 and Comparative Example 1.

FIG. 3 shows the current and potential characteristics of the oxygen reduction reaction upon supplying air to the cathode room 14. FIG. 4 shows the current and potential characteristics of the oxygen reduction reaction upon supplying oxygen to the cathode room 14. The electrode potential was converted to the reversible hydrogen electrode (hereinafter, the same shall apply).

Figure 5:
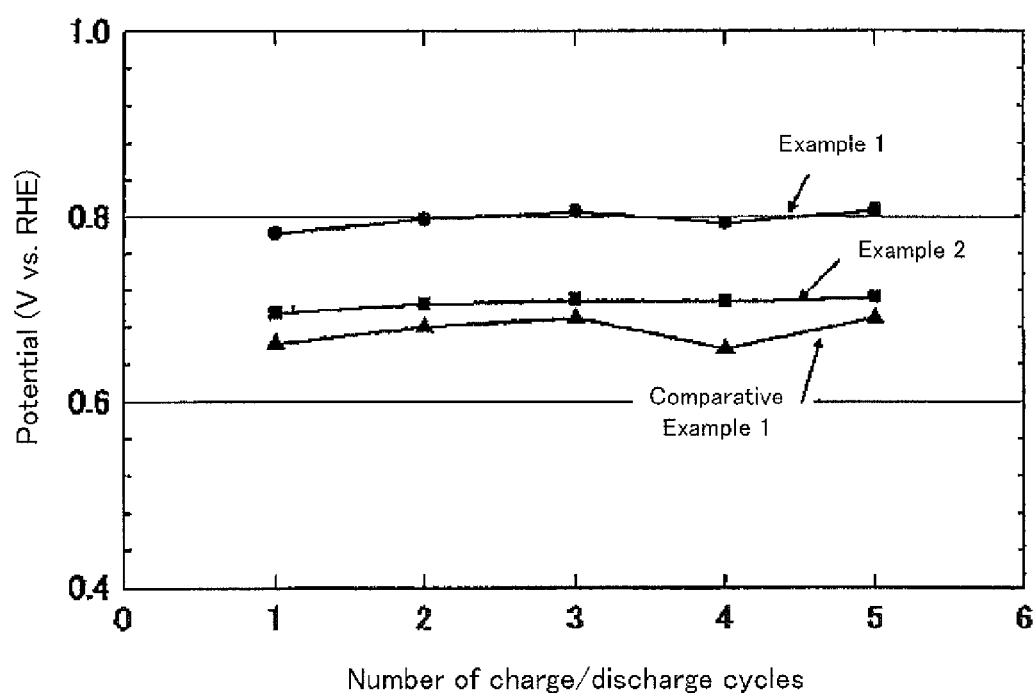
FIG. 5 is a graph showing the relationship between the oxygen reduction potential and the number of charge/discharge cycles for the air cathodes of Examples 1 and 2 and Comparative Example 1.

Also, changes in oxygen reduction potential were measured during five cycles of an operation in which oxygen reduction reaction was run for 30 minutes at a current density of 20 $mA/cm^2$ and then oxygen generation reaction was run for 30 minutes at a current density of 20 $mA/cm^2$, both of which reactions were performed while supplying air to the cathode room 14. The measurement temperature was fixed at 50° C. The result is shown in FIG. 5.

In the air cathode of a secondary battery, oxygen reduction corresponds to discharge, and oxygen generation corresponds to charge.

Example 2

An air cathode was produced in the same manner as Example 1, except that the oxide electrode catalyst, tungsten carbide, acetylene black and PTFE were mixed and kneaded at a weight ratio of 40:20:20:20, as shown in Table 1.

The electrode reaction characteristics of the thus-produced air cathode were measured in the same manner as Example 1. The results are shown in FIGS. 3 to 5.

Comparative Example 1

An air cathode was produced in the same manner as Example 1, except that the oxide electrode catalyst, acetylene black and PTFE were mixed and kneaded at a weight ratio of 40:40:20, as shown in Table 1, without using the tungsten carbide.

The electrode reaction characteristics of the thus-produced air cathode were measured in the same manner as Example 1. The results are shown in FIGS. 3 to 5.

TABLE 1

|  | $La_{0.7}Sr_{0.3}CoO_3$ | WC | Acetylene black | PTFE |
| --- | --- | --- | --- | --- |
| Example 1 | 40 | 30 | 10 | 20 |
| Example 2 | 40 | 20 | 20 | 20 |
| Comparative Example 1 | 40 | 0 | 40 | 20 |

As shown in FIGS. 3 to 5, it is clear that compared to the air cathode of Comparative Example 1, the air cathodes of Examples 1 and 2 are higher in oxygen reduction potential and show excellent performance. More specifically, it is clear from FIGS. 3 and 4 that compared to the air cathode of Comparative Example 1, the air cathodes of Examples 1 and 2 are able to maintain higher potential over the wide range from low current density range to high current density range. It is also clear from FIG. 5 that compared to the air cathode of Comparative Example 1, the air cathodes of Examples 1 and 2 are able to maintain high oxygen reduction potential after the five cycles and have excellent cycle characteristics. Especially, the air cathode of Example 1, in which the tungsten carbide ratio in the catalyst layer is 30% by weight, showed more significant increase in characteristics than Example 2, in which the tungsten carbide ratio is 20% by weight.

Example 3

An air cathode was produced in the same manner as Example 1, except that a titanium carbide (manufactured by Wako Pure Chemical Industries, Ltd.; average particle diameter: about 4 μm) was used in place of the tungsten carbide, and the oxide electrode catalyst, titanium carbide, acetylene black and PTFE were mixed and kneaded at a weight ratio of 40:20:20:20, as shown in Table 2.

The electrode reaction characteristics of the thus-produced air cathode were measured by means of a two-compartment cell similar to that of Example 1.

Figure 6:
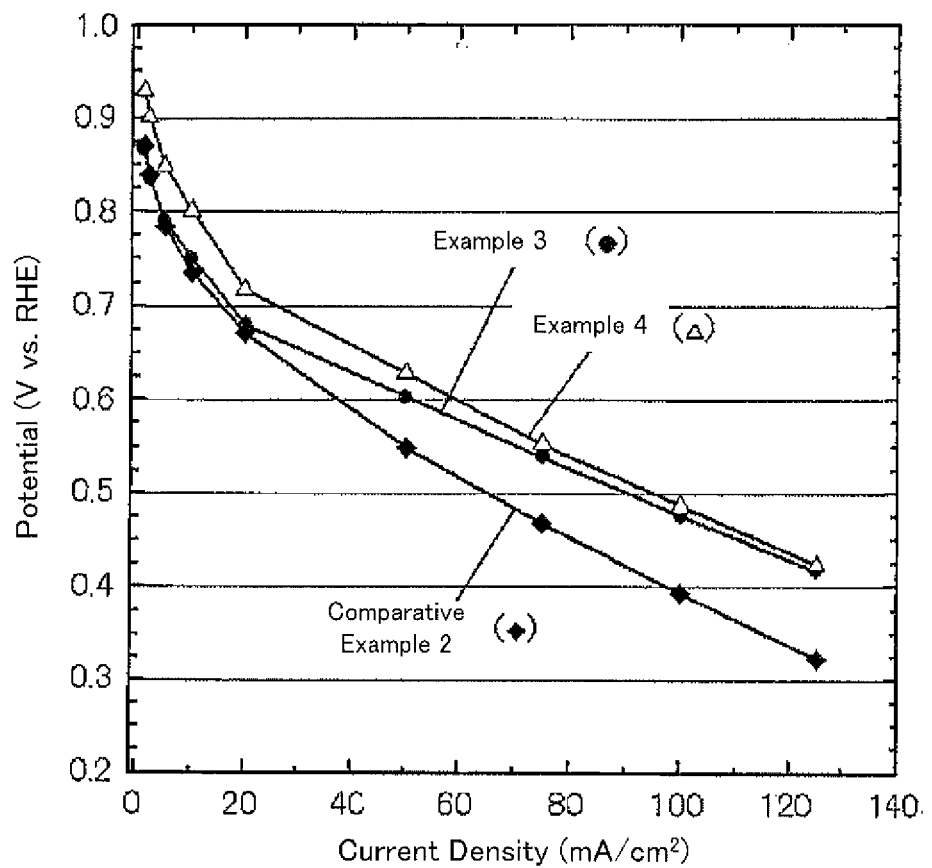
FIG. 6 is a graph showing the current and potential characterization results for the oxygen reduction reaction of the air cathodes of Examples 3 and 4 and Comparative Example 2.

More specifically, air was supplied to the cathode room 14, and while applying a constant current to the working electrode 15 for a fixed time, the potential (oxygen reduction potential) of the working electrode 15 was measured. The measurement temperature was fixed at 50° C. The result is shown in FIG. 6.

Example 4

An air cathode was produced in the same manner as Example 3, except that a molybdenum carbide (manufactured by Wako Pure Chemical Industries, Ltd.; average particle diameter: about 7 µm) was used in place of the titanium carbide, and the oxide electrode catalyst, molybdenum carbide, acetylene black and PTFE were mixed and kneaded at a weight ratio of 40:20:20:20, as shown in Table 2.

The electrode reaction characteristics of the thus-produced air cathode were evaluated in the same manner as Example 3. The result is shown in FIG. 6.

Comparative Example 2

An air cathode was produced in the same manner as Example 3, except that the oxide electrode catalyst, acetylene black and PTFE were mixed and kneaded at a weight ratio of 40:40:20, as shown in Table 2, without using the titanium carbide.

The electrode reaction characteristics of the thus-produced air cathode were evaluated in the same manner as Example 3. The result is shown in FIG. 6.

TABLE 2

|  | $La_{0.7}Sr_{0.3}CoO_3$ | Metal carbide | Acetylene black | PTFE |
| --- | --- | --- | --- | --- |
| Example 3 | 40 | 20 (TiC) | 20 | 20 |
| Example 4 | 40 | 20 ($Mo_2C$) | 20 | 20 |
| Comparative Example 3 | 40 | 0 | 40 | 20 |

As shown in FIG. 6, it is clear that compared to the air cathode of Comparative Example 2, the air cathodes of Examples 3 and 4 are higher in oxygen reduction potential and show excellent performance. More specifically, it is clear that compared to the air cathode of Comparative Example 2, the air cathodes of Examples 3 and 4 are able to maintain high potential over the wide range from low current density range to high current density range.

Example 5

Production of Air Cathode for Secondary Batteries

First, an oxide electrode catalyst ($La_{0.7}Sr_{0.3}CoO_3$) produced in the same manner as Example 1, a tungsten carbide (manufactured by Nacalai Tesque, Inc.; average particle diameter: about 4 µm), and a polytetrafluoroethylene dispersion liquid (manufactured by: Sigma-Aldrich Japan K.K.; 60% by weight) were mixed so as to have a ratio of oxide electrode catalyst:tungsten carbide:PTFE=67:28:5 (weight ratio), as shown in Table 3, thereby preparing a catalyst slurry.

An acetylene black (manufactured by: Denki Kagaku Kogyo Kabushiki Kaisha; average particle diameter: about 0.8 µm; specific surface area: about 33 $m^2/g$; true density: about 1.8 $g/cm^3$) and a polytetrafluoroethylene dispersion liquid (manufactured by: Sigma-Aldrich Japan K.K.; 60% by weight) were mixed and kneaded at a ratio of acetylene black:PTFE=80:20 (weight ratio). The resultant was roll-pressed by means of an electric roll-pressing roller to have a thickness of about 200 µm, thus preparing a carbon sheet. This carbon sheet was cut into a disk having a diameter of about 24 mm. The disk was attached by pressure to a first surface of a carbon paper (EC-TP1-120T manufactured by ElectroChem. Inc.) in the form of a disk having a diameter of about 24 mm.

Next, the catalyst slurry was applied to the carbon sheet surface of the two-layered gas diffusion layer sheet, and then dried to obtain an air cathode. The catalyst slurry was applied to the carbon sheet surface so that the total amount of the tungsten carbide and $La_{0.7}Sr_{0.3}CoO_3$ is 3 $mg/cm^2$.

(Evaluation of Air Cathode for Secondary Batteries)

The electrode reaction characteristics of the air cathode produced above were evaluated as follows, by means of a two-compartment cell.

Figure 7:
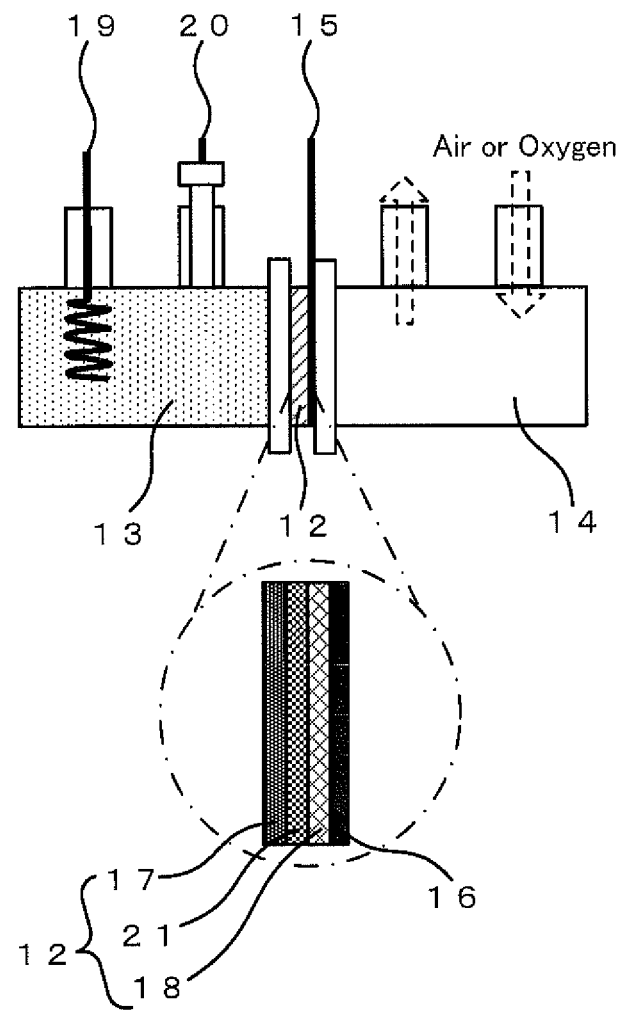
FIG. 7 is a schematic sectional view of the two-compartment cell used for air cathode evaluation in Examples 5 to 7 and Comparative Examples 3 and 4.

As shown in FIG. 7, the two-compartment cell used for the evaluation is similar to the two-compartment cell shown in FIG. 2. However, while FIG. 2 shows that the air cathode 12 used for the test has a two-layered structure comprising the catalyst layer 17 and the carbon paper 18, the air cathode of Example 5 has a three-layered structure in which the catalyst layer 17, the carbon sheet 21 and the carbon paper 18 are stacked in this order, as shown in FIG. 7.

Figure 8:
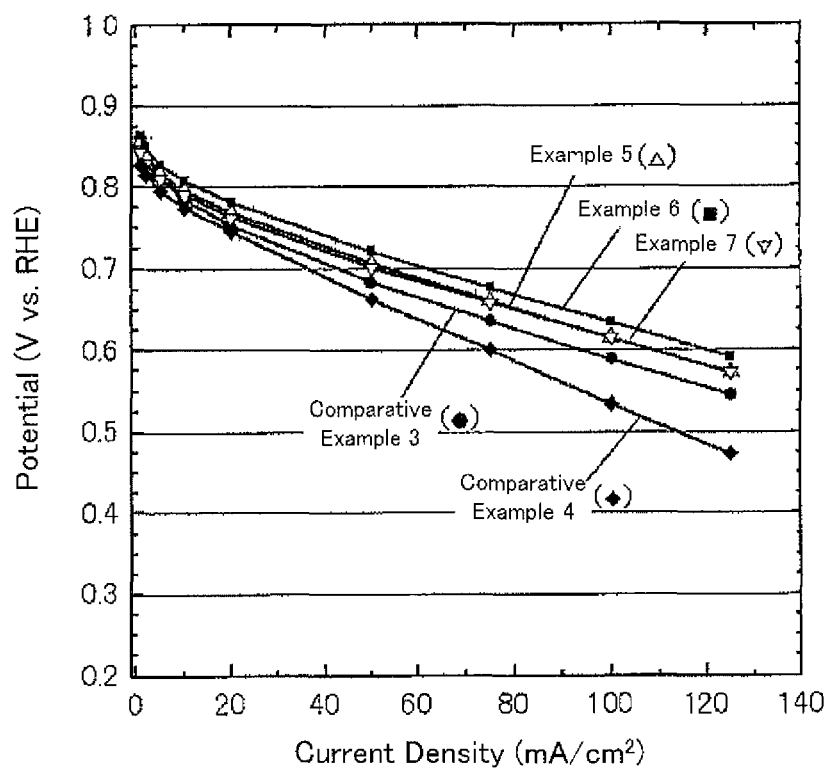
FIG. 8 is a graph showing the current and potential characterization results for the oxygen reduction reaction of the air cathodes of Examples 5 to 7 and Comparative Examples 3 and 4.

The air cathode 12 was evaluated by measuring the potential of the working electrode 15, while applying a constant current to the working electrode 15 for a fixed time. The measurement temperature was fixed at 50° C. The result is shown in FIG. 8. FIG. 8 shows the current and potential characteristics of the oxygen reduction reaction upon supplying oxygen to the cathode room 14.

Cyclic voltammetry was carried out by changing the potential of the air cathode in the range from 0.5 to 1.7 V (vs.RHE) at a rate of 10 mV/sec, while supplying air to the cathode room 14. The measurement temperature was fixed at 50° C. In Table 3, current density at 0.5 V is shown as the indicator of oxygen reduction performance, while current density at 1.7 V is shown as the indicator of oxygen generation performance.

Example 6

An air cathode was produce in the same manner as Example 5, except that the oxide electrode catalyst, tungsten carbide and PTFE were mixed at a weight ratio of 38:57:5, as shown in Table 3.

The electrode reaction characteristics of the thus-produced air cathode were evaluated in the same manner as Example 5. The results are shown in FIG. 8 and Table 3.

Example 7

An air cathode was produced in the same manner as Example 5, except that the oxide electrode catalyst, tungsten carbide and PTFE were mixed at a weight ratio of 24:71:5, as shown in Table 3.

The electrode reaction characteristics of the thus-produced air cathode were evaluated in the same manner as Example 5. The results are shown in FIG. 8 and Table 3.

Comparative Example 3

An air cathode was produced in the same manner as Example 5, except that the oxide electrode catalyst and PTFE were mixed at a weight ratio of 95:5, as shown in Table 3, without using the tungsten carbide.

The electrode reaction characteristics of the thus-produced air cathode were evaluated in the same manner as Example 5. The results are shown in FIG. 8 and Table 3.

Comparative Example 4

An air cathode was produced in the same manner as Example 5, except that the tungsten carbide and PTFE were mixed at a weight ratio of 95:5, as shown in Table 3, without using the oxide electrode catalyst.

The electrode reaction characteristics of the thus-produced air cathode were evaluated in the same manner as Example 5. The results are shown in FIG. 8 and Table 3.

TABLE 3

| | Weight ratio | | | Oxygen reduction current [0.5 V vs. RHE] (mA/cm$^2$) | Oxygen generation current [1.7 V vs. RHE] (mA/cm$^2$) |
|---|---|---|---|---|---|
| | $La_{0.7}Sr_{0.3}CoO_3$ | WC | PTFE | | |
| Example 5 | 67 | 28 | 5 | 100.2 | 56.0 |
| Example 6 | 38 | 57 | 5 | 105.8 | 49.9 |
| Example 7 | 24 | 71 | 5 | 86.3 | 37.5 |
| Comparative Example 3 | 95 | 0 | 5 | 79.3 | 34.1 |
| Comparative Example 4 | 0 | 95 | 5 | 46.8 | 11.1 |

As shown in FIG. 8 and Table 3, it is clear that compared to the air cathodes of Comparative Examples 3 and 4, the air cathodes of Examples 5 to 7 are higher in oxygen reduction potential and show excellent oxygen generation performance. More specifically, it is clear from FIG. 8 that compared to the air cathodes of Comparative Examples 3 and 4, the air cathodes of Examples 5 to 7 are able to maintain high potential over the wide range from low current density range to high current density range. It is also clear from Table 1 that compared to the air cathodes of Comparative Examples 3 and 4, the air cathodes of Examples 5 to 7 are higher in both oxygen reduction current and oxygen generation current, and they are excellent in both oxygen reduction performance and oxygen generation performance.

REFERENCE SIGNS LIST

1. Air cathode
2. Anode
3. Electrolyte layer
4. Catalyst layer
5. Gas diffusion layer
5a. First gas diffusion layer
5b. Second gas diffusion layer
6. Air cathode current collector
7. Air cathode can
8. Anode can
9. Gasket
10. Oxygen inlet hole
11. Air battery
12. Air cathode
13. Anode room
14. Cathode room
15. Working electrode
16. Current collector
17. Catalyst layer
18. Carbon paper
19. Counter electrode
20. Reference electrode
21. Carbon sheet

The invention claimed is:

1. An air cathode for air batteries, using oxygen as an active material and configured to form an air battery comprising the air cathode, an anode and an electrolyte layer present between the air cathode and the anode,
the air cathode comprising:
a catalyst layer which contains at least an electrode catalyst and an electroconductive material;
an oxide as the electrode catalyst, which is active against at least oxygen reduction reaction; and
a tungsten carbide as the electroconductive material,
wherein the ratio of the amount of the tungsten carbide to the amount of the catalyst layer is 28 to 71% by weight.

2. The air cathode for air batteries according to claim 1, wherein the ratio of the amount of the tungsten carbide to the total amount of the oxide and the tungsten carbide is 28 to 71% by weight.

3. The air cathode for air batteries according to claim 1, wherein the oxide is a complex oxide comprising at least one kind of metal element selected from the group consisting of iron, cobalt, nickel, titanium, manganese and copper and having a perovskite structure or spinel structure.

4. The air cathode for air batteries according to claim 3, wherein the oxide is a complex oxide having a perovskite structure and having a composition represented by $La_{1-x}A_xBO_3$ (wherein A is at least one kind selected from the group consisting of Sr and Ca; B is at least one kind selected from the group consisting of Co, Fe and Mn; and x is a number which satisfies $0 \leq x \leq 1$).

5. The air cathode for air batteries according to claim 1, wherein the electroconductive material further comprises an electroconductive carbon.

6. The air cathode for air batteries according to claim 1, further comprising a gas diffusion layer comprising at least electroconductive carbon particles and a binder,
wherein the catalyst layer and the gas diffusion layer are stacked in this order from the electrolyte layer side.

7. An air battery comprising: an air cathode using oxygen as an active material, an anode and an electrolyte layer present between the air cathode and the anode,
wherein the air cathode is the air cathode for air batteries defined by claim 1.

* * * * *